United States Patent [19]

Beaven et al.

[11] Patent Number: 4,982,402
[45] Date of Patent: Jan. 1, 1991

[54] METHOD AND APPARATUS FOR DETECTING AND CORRECTING ERRORS IN A PIPELINED COMPUTER SYSTEM

[75] Inventors: Richard C. Beaven, Sudbury; Michael B. Evans, Marlboro; Tryggve Fossum; Ricky C. Hetherington, both of Northboro; William R. Grundmann, Hudson; John E. Murray, Acton; Ronald M. Salett, Framingham, all of Mass.

[73] Assignee: Digital Equipment Corporation, Maynard, Mass.

[21] Appl. No.: 306,828

[22] Filed: Feb. 3, 1989

[51] Int. Cl.⁵ .............................................. G06F 11/14
[52] U.S. Cl. ..................................... 371/12; 371/16.1; 364/200
[58] Field of Search ...................... 371/12, 16.1, 16.5, 371/15.1, 22.3; 364/200 MS File, 900 MS File

[56] References Cited

U.S. PATENT DOCUMENTS

| | | | |
|---|---|---|---|
| 4,293,919 | 10/1981 | Dasgupta et al. | 364/716 |
| 4,500,958 | 2/1985 | Manton et al. | 364/200 |
| 4,583,222 | 4/1986 | Fossum et al. | 371/16 |
| 4,757,445 | 7/1988 | Zolonowsky et al. | 364/200 |

OTHER PUBLICATIONS

Fossum et al., "An Overview of the VAX 8600 System," Digital Technical Journal, No. 1, Aug. 1985, pp. 8-23.
Troiani et al., "The VAX 8600 I Box, A Pipelined Implementation of the VAX Architecture," Digital Technical Journal, No. 1, Aug. 1985, pp. 24-42.
Fossum et al., "The F Box, Floating Point in the VAX 8600 System," Digital Technical Journal, No. 1, Aug. 1985, pp. 43-53.
Bruckert et al., "Designing Reliability Into the VAX 8600 System," Digital Technical Journal, No. 1, Aug. 1985, pp. 71-77.

Primary Examiner—Jerry Smith
Assistant Examiner—Robert W. Beausoliel
Attorney, Agent, or Firm—Arnold, White & Durkee

[57] ABSTRACT

In a multiprocessor system, an error occurring in any one of the CPUs may have an impact upon the operation of the remaining CPUs, and therefore these errors must be handled quickly. The errors are grouped into two categories: synchronous errors (those that must be corrected immediately to allow continued processing of the current instruction); and asynchronous errors (those errors that do not affect execution of the current instruction and may be handled upon completing execution of the current instruction). Since synchronous errors prevent continued execution of the current instruction, it is preferable that the last stable state conditions of the faulting CPU be restored and the faulting instruction reexecuted. These stable state conditions advantageously occur between the execution of each instruction. However, in a pipelined computer system, it is difficult to identify the beginning and ending of a selected instruction since multiple instructions are in process at the same time. Accordingly, the execution unit is selected to be the point of synchronization between error handling and instruction execution. Once the error is indentified as asynchronous or synchronous and the execution unit allows the instruction to complete or rolls back the state conditions to their preinstruction values, error analyzing software examines the condition of the suspect data latches in the CPU. A serial diagnostic link stops the system clock of the CPU and serially loads the CPU data latches into the System Processor Unit for error determination. Thereafter, the CPU system clock is restarted and the CPU resumes execution.

18 Claims, 7 Drawing Sheets

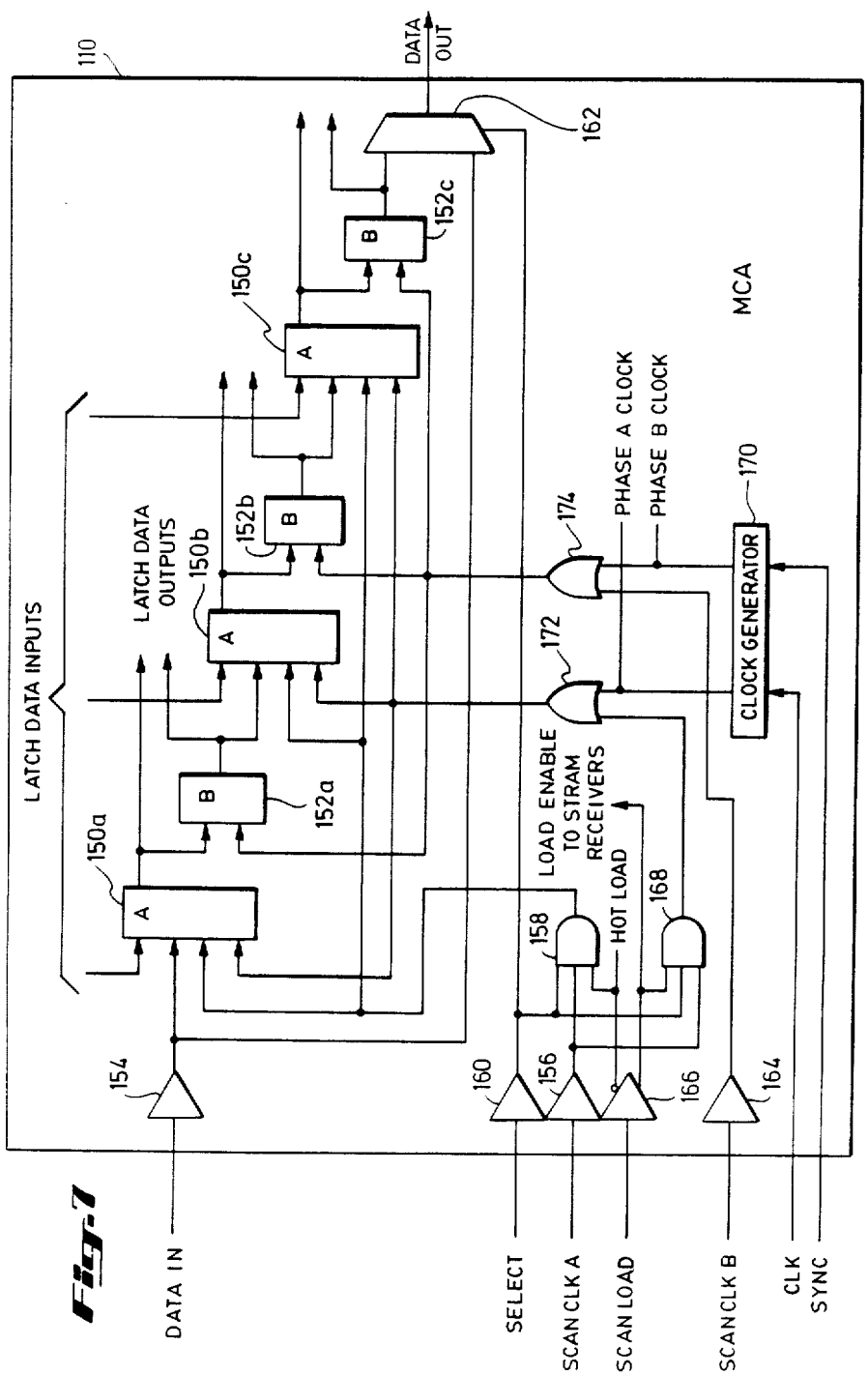

METHOD AND APPARATUS FOR DETECTING AND CORRECTING ERRORS IN A PIPELINED COMPUTER SYSTEM

RELATED APPLICATIONS

The present application discloses certain aspects of a computing system that is further described in the following U.S. patent applications filed concurrently with the present application: Evans et al., AN INTERFACE BETWEEN A SYSTEM CONTROL UNIT AND A SERVICE PROCESSING UNIT OF A DIGITAL COMPUTER, Ser. No. 07/306,325 filed Feb. 3, 1989; Arnold et al., METHOD AND APPARATUS FOR INTERFACING A SYSTEM CONTROL UNIT FOR A MULTIPROCESSOR SYSTEM WITH THE CENTRAL PROCESSING UNITS, Ser. No. 07/306,837 field Feb. 3, 1989; Gagliardo et al., METHOD AND MEANS FOR INTERFACING A SYSTEM CONTROL UNIT FOR A MULTI-PROCESSOR SYSTEM WITH THE SYSTEM MAIN MEMORY, Ser. No. 07/306,326 filed Feb. 3, 1989; D. Fite et al., METHOD AND APPARATUS FOR RESOLVING A VARIABLE NUMBER OF POTENTIAL MEMORY ACCESS CONFLICTS IN A PIPELINED COMPUTER SYSTEM, Ser. No. 07/306,767 filed Feb. 3, 1989; D. Fite et al., DECODING MULTIPLE SPECIFIERS IN A VARIABLE LENGTH INSTRUCTION ARCHITECTURE, Ser. No. 07/306,347 field Feb. 3, 1989; D. Fite et al., VIRTUAL INSTRUCTION CACHE REFILL ALGORITHM, Ser. No. 07/306,831 field Feb. 3, 1989; Murray et al., PIPELINE PROCESSING OF REGISTER AND REGISTER MODIFYING SPECIFIERS WITHIN THE SAME INSTRUCTION, Ser. No. 07/306,833 filed Feb. 3, 1989; Murray et al., MULTIPLE INSTRUCTION PREPROCESSING SYSTEM WITH DATA DEPENDENCY RESOLUTION FOR DIGITAL COMPUTERS, Ser. No. 07/306,773 field Feb. 3, 1989; Murray et al., PREPROCESSING IMPLIED SPECIFIERS IN A PIPELINED PROCESSOR, Ser. No. 07/306,846 filed Feb. 3, 1989; D. Fite et al., METHOD OF BRANCH PREDICTION, Ser. No. 07/306,760 field Feb. 3, 1989; Fossum et al., PIPELINED FLOATING POINT ADDER FOR DIGITAL COMPUTER, Ser. No. 07/306,343 field Feb. 3, 1989; Grundmann et al., SELF TIMED REGISTER FILE, Ser. No. 07/306,445 filed Feb. 3, 1989; Flynn et al., METHOD AND MEANS FOR ARBITRATING COMMUNICATION REQUESTS USING A SYSTEM CONTROL MUNIT IN A MULTI-PROCESSOR SYSTEM, Ser. No. 07/306,871 field Feb. 3, 1989; E. Fite et al., CONTROL OF MULTIPLE FUNCTION UNITS WITH PARALLEL OPERATION IN A MICROCODED EXECUTION UNIT, Ser. No. 07/306,832 filed Feb. 3, 1989; Webb, Jr. et al., PROCESSING OF MEMORY ACCESS EXCEPTIONS WITH PRE-FETCHED INSTRUCTIONS WITHIN THE INSTRUCTION PIPELINE OF A VIRTUAL MEMORY SYSTEM-BASED DIGITAL COMPUTER, Ser. No. 07/306,866 field Feb. 3, 1989; Hetherington et al., METHOD AND APPARATUS FOR CONTROLLING THE CONVERSION OF VIRTUAL TO PHYSICAL MEMORY ADDRESSES IN A DIGITAL COMPUTER SYSTEM, Ser. No. 07/306,544 filed Feb. 3, 1989; Hetherington et al., WRITE BACK BUFFER WITH ERROR CORRECTING CAPABILITIES, Ser. No. 07/306,703 filed Feb. 3, 1989; Flynn et al., METHOD AND MEANS FOR ARBITRATING COMMUNICATION REQUESTS USING A SYSTEM CONTROL UNIT IN A MULTI-PROCESSING SYSTEM, Ser. No. 07/306,871 filed Feb. 3, 1989; Chinnaswawy et al., MODULAR CROSSBAR INTERCONNECTION NETWORK FOR DATA TRANSACTIONS BETWEEN SYSTEM UNITS IN A MULTI-PROCESSOR SYSTEM, Ser. No. 07/306,336 filed Feb. 3, 1989; Polzin et al., METHOD AND APPARATUS FOR INTERFACING A SYSTEM CONTROL UNIT FOR A MULTI-PROCESSOR SYSTEM WITH INPUT/OUTPUT UNITS, Ser. No. 07/306,862 filed Feb. 3, 1989; Gagliardo et al., MEMORY CONFIGURATION FOR USE WITH MEANS FOR INTERFACING A SYSTEM CONTROL UNIT FOR A MULTI-PROCESSOR SYSTEM WITH THE SYSTEM MAIN MEMORY, Ser. No. 07/306,404 filed Feb. 3, 1989; and Gagliardo et al., METHOD AND MEANS FOR ERROR CHECKING OF DRAM-CONTROL SIGNALS BETWEEN SYSTEM MODULES, Ser. No. 07/306,836 filed Feb. 3, 1989.

TECHNICAL FIELD

This invention is generally directed to a method and apparatus for handling errors in a pipelined computer system, and more particularly, to a computer system where synchronous and asynchronous faults are differentiated between and different routines are employed to recover from each fault type.

DESCRIPTION OF RELATED ART

Conventional digital computers process data in accordance with "fetch-execute" cycles in which instructions are fetched from memory and executed. Each cycle may include a number of intermediate steps, depending on the specific instruction. An instruction, for example, may specify operands which must be fetched from memory before the instruction is executed.

In small, low-speed computers, the fetch-execute cycle is performed for one instruction at a time. For example, the fetch of the next instruction does not occur until the result of the current instruction has been stored. The hardware devoted to each step in the fetch-execute cycle is used only during that corresponding step and then remains idle until needed for the next instruction. Accordingly, errors that occur during the execution of these discrete instructions are relatively easy to isolate and can be attributed to the current instruction. Thus, correcting such an error is effected by restoring the state conditions to their pre-instruction status and restarting computer execution. These state conditions are well defined in terms of memory contents and register values between the execution of each instruction. Therefore, it is generally a simple process to "back up" the execution to the beginning of the instruction and re-execute the instruction.

Larger computers shorten their execution time by prefetching instructions so that the next instruction is ready for decoding as soon as the result of the current instruction is stored. This is a simple form of "pipelining" in which the first step in the cycle is performed for the next instruction at the same time that the last step is performed for the current instruction. This simple form of pipelining decreases the total time for performing the instructions.

The most advanced computers pipeline the entire sequence of instruction activities. A prime example is the VAX 8600 computer manufactured and sold by Digital Equipment Corporation, 111 Powdermill Road, Maynard, MA 01754-1418. The instruction pipeline for the VAX 8600 is described in T. Fossum et al, "An Overview of the VAX 8600 System," Digital Technical Journal, No. 1, Aug. 1985, pp. 8-23. Separate pipeline stages are provided for instruction fetch, instruction decode, operand address generation, operand fetch, instruction decode, operand address generation, operand fetch, instruction execute, and result store.

It should be apparent that at any point in time there are multiple instructions in various stages of execution. The complexity of the instruction pipeline makes it difficult to determine when an individual instruction has been completed. Thus, error handling, which can readily be accomplished during the stable state conditions existing between the execution of each instruction, becomes increasingly difficult when these stable state conditions are not readily determinable. It is relatively simple to determine when an instruction is complete if only one instruction is being executed; however, when multiple instructions are being simultaneously executed it is difficult to determine when any one instruction is complete.

SUMMARY OF THE INVENTION

To quickly and efficiently correct errors that occur during the operation of a pipelined central processing unit of a multiple central processing unit computer system, the handling of the errors distinguishes between errors that prevent the current instruction from completing, and errors that have no affect on the instruction currently being executed. More specifically, the errors are handled by: detecting an error and delivering an error signal to the execution unit; determining if the detected error is synchronous and thereby prevents complete execution of the instruction currently being executed by the execution unit; restoring the computer system state conditions to their status immediately prior to the beginning of the execution of the current instruction in response to the error being synchronous; allowing the execution of the current instruction to complete in response to the error being asynchronous and thereby having no affect on the complete execution of the instruction currently being executed by the execution unit; halting the system clock of the central processing unit; serially shifting the contents of selected central processing unit latches out of the central processing unit; and restarting the central processing unit system clock.

BRIEF DESCRIPTION OF THE DRAWINGS

Other objects and advantages of the invention will become apparent upon reading the following detailed description and upon reference to the drawings in which:

FIG. 7 is a schematic diagram of the serial diagnostic latches and control circuitry within a macro-cell array.

Figure 1:
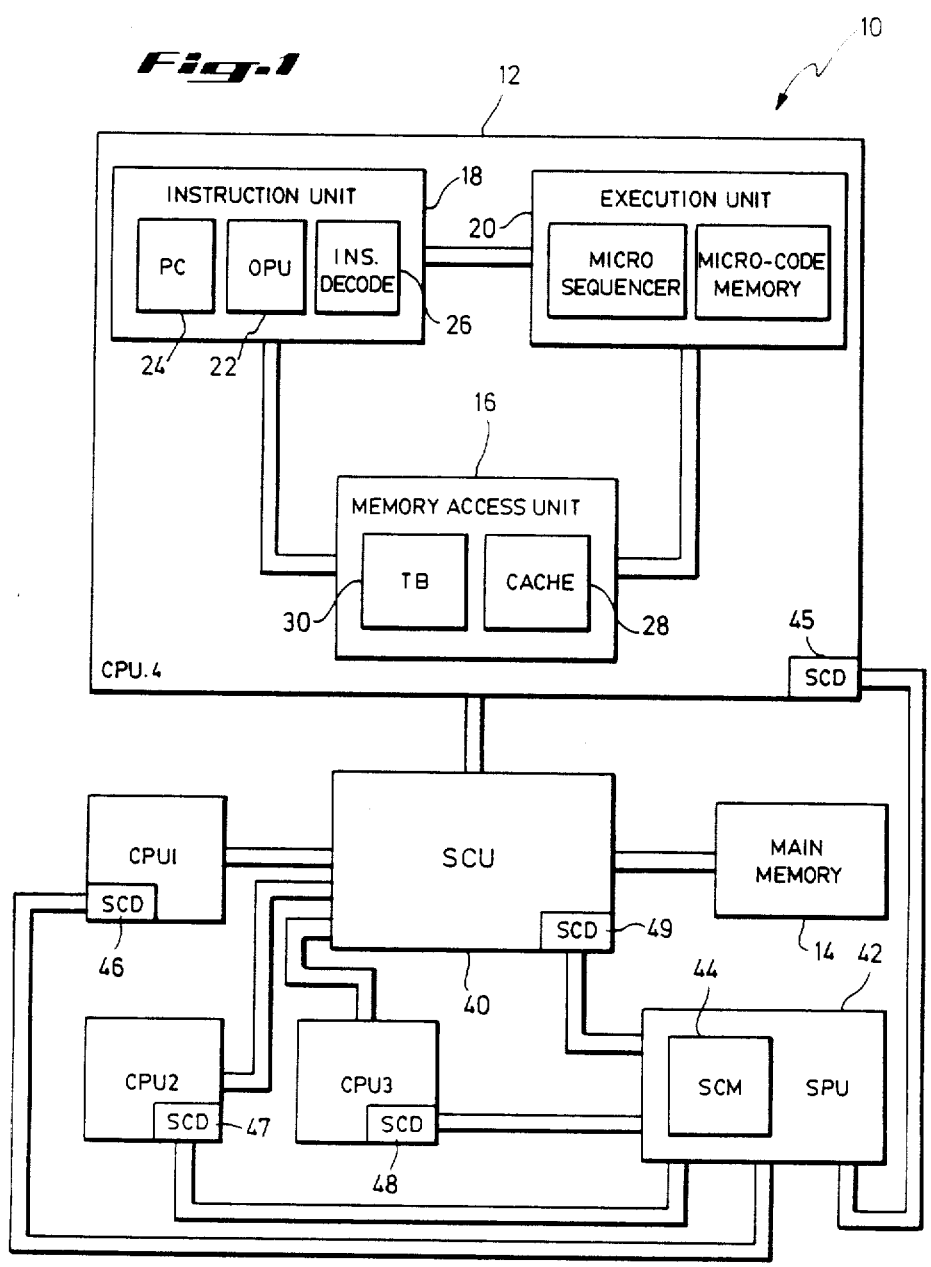
FIG. 1 is a top level block diagram of a portion of a computer system having paralleled CPUs, main memory, a system control unit, and a system processor unit.

While the invention is susceptible to various modifications and alternative forms, specific embodiments thereof have been shown by way of example in the drawings and will be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DESCRIPTION OF THE PREFERRED EMBODIMENTS

FIG. 1 is a top level block diagram of a portion of a pipelined computer system 10. The system 10 includes at least one central processing unit (CPU) 12 having access to main memory 14. It should be understood that additional CPUs operate in the system 10 by sharing the main memory 14. Four CPUs, for example, may operate simultaneously and communicate efficiently through the shared main memory 14.

Inside the CPU 12, the execution of an individual instruction is broken down into multiple smaller tasks. These tasks are performed by dedicated, separate, independent functional units that are optimized for that purpose.

Although each instruction ultimately performs a different operation, many of the smaller tasks into which each instruction is broken are common to all instructions. Generally, the following steps are performed during the execution of an instruction: instruction fetch, instruction decode, operand fetch, execution, and result store. Thus, by the use of dedicated hardware stages, the steps can be overlapped, thereby increasing the total instruction throughput.

The data path through the pipeline includes a respective set of registers for transferring the results of each pipeline stage to the next pipeline stage. These transfer registers are clocked in response to a common system clock. For example, during a first clock cycle, the first instruction is fetched by hardware dedicated to instruction fetch. During the second clock cycle, the fetched instruction is transferred and decoded by instruction decode hardware, but, at the same time, the next instruction is fetched by the instruction fetch hardware. During the third clock cycle, each instruction is shifted to the next stage of the pipeline and a new instruction is fetched. Thus, after the pipeline is filled, an instruction will be completely executed at the end of each clock cycle.

This process is analogous to an assembly line in a manufacturing environment. Each worker is dedicated to performing a single task on every product that passes through his or her work stage. As each task is performed the product comes closer to completion. At the final stage, each time the worker performs his assigned task a completed product rolls off the assembly line.

As shown in FIG. 1, each CPU 12 is partitioned into at least three functional units: the memory access unit 16, the instruction unit 18, and the execution unit 20.

The instruction unit 18 prefetches instructions, decodes the instructions to obtain opcodes and source and destination specifiers, fetches operands, and updates the program counter. The instruction unit 18 includes an operand processing unit (OPU) 22, a program counter (PC) 24, and an instruction decoder 26. The program counter 24 is maintained in the instruction unit 18 so that the proper instructions can be retrieved from a high-speed cache memory 28 maintained in the memory access unit 16. The cache 28 stores a copy of a small portion of the information stored in the main memory 14 and is employed to increase processing speed by reducing memory access time.

The program counter 24 preferably uses virtual memory locations rather than the physical memory locations of main memory 14 and cache 28. Thus, the virtual address of the program counter 24 must be translated into the physical address of main memory 14 before instructions can be retrieved. Accordingly, the contents of the program counter 24 are transferred to the memory access unit 16 where a translation buffer (TB) 30 performs the address conversion. The instruction is retrieved from its physical memory location in cache 28 using the converted address. The cache 28 delivers the instruction over the data return lines to the instruction decoder 26. The organization and operation of the cache 28 and translation buffer 30 are further described in Chapter 11 of Levy and Eckhouse, Jr., Computer Programming and Architecture, The VAX-11, Digital Equipment Corporation, pp. 351-368 (1980).

The OPU 22 also produces virtual addresses. In particular, the OPU 22 produces virtual addresses for memory source (read) specifiers and destination (write) specifiers. For at least the memory source specifiers, the OPU 22 must deliver these virtual addresses to the memory access unit 16 where they are translated to physical addresses. The physical memory locations of the cache 28 are then accessed to fetch the operands for the memory source specifiers. The OPU 22 also delivers virtual addresses to the memory access unit 16 for the memory destination specifiers.

The virtual address, for example, is a 32-bit binary number. In addition to transmitting the 32-bit virtual address, the OPU 22 also delivers a 3-bit control field to indicate whether the instruction specifies a read or write operation. In the event that the control field indicates that the virtual address corresponds to a read operation, the cache 28 retrieves the data from the identified physical memory location and delivers the data to the execution unit 20.

Conversely, for a write operation the write address is stored until the data to be written is available. Clearly, for instructions such as MOVE or ADD, the data to be written is not available until execution of the instruction has been completed. However, the virtual address of the destination can be translated to a corresponding physical address during the time required for execution of the instruction. Also, it is desirable for the OPU 22 to preprocess multiple instruction specifiers during this time in order to increase the overall rate at which instructions are performed. For these purposes, the memory access unit 16 is provided with a "write queue" (not shown) between the translation buffer 30 and the cache 28 for storing the physical destination addresses of a variable number of write operations. The write queue maintains the address until the execution unit 20 completes the instruction and sends the resulting data to the memory access unit 16. This data is paired with the previously stored write address and written into the cache 28 at the corresponding memory location.

In addition to memory operands, the OPU 22 also processes immediate operands, short literals, and register operands. In each of these types of specifiers the OPU 22 delivers data or pointers directly to the execution unit 20.

The first step in processing the instructions is to decode the "opcode" portion of the instruction. The first portion of each instruction consists of its opcode which specifies the operation to be performed in the instruction. The decoding is done using a table-look-up technique in the instruction decoder 26. The instruction decoder 26 send the decoded opcode to the execution unit 20 where it is used to address a look-up table which provides a microcode starting address. Later, the execution unit 20 performs the specified operation by executing prestored microcode, beginning at the indicated starting address. Also, the decoder 26 determines where source-operand and destination-operand specifiers occur in the instruction and passes these specifiers to the operand processing unit 22 for pre-processing prior to execution of the instruction.

The memory access unit 16 includes the cache 28, the translation buffer 30, the write queue, a register, and a multiplexer. As noted above, the cache 28 is a high-speed memory that stores a copy of a small portion of the information stored in main memory. The cache 28 is accessible at a much higher rate than the main memory. Its purpose, therefore, is to reduce the average time necessary for a memory access (i.e., a read or write) to be performed. Since the cache 28 stores only a small portion of the information stored in main memory, there will occasionally be instructions which attempt to access memory not contained in the cache 28. The cache 28 recognizes when these "misses" occur, and in these instances the cache 28 retrieves the identified data from main memory 14. Of course, during these "misses" performance of the CPU 12 will suffer. However, the overall memory access speed is increased with the use of a cache.

The translation buffer 30 is a high-speed, associative memory that stores the most recently used virtual-to-physical address translations. In a virtual memory system, a reference to a single virtual address can cause several memory references before the desired information is made available. However, where the translation buffer 30 is used, translation is reduced to simply finding a "hit" in the translation buffer 30.

Once the virtual-to-physical address translation is complete, the physical address is transferred to either the write queue or the register. As its name suggests, the write queue receives the physical address only if the corresponding operation is a write to memory. The purpose of the write queue is to provide a temporary storage location for the physical write address of the write operation. Because of the pipeline nature of the CPU 12, the write address is usually available before the data to be stored in that address is available. In fact, the data will only become available after the execution of the instruction in the execution unit 20. Moreover, because it is desired to preprocess multiple operand specifiers for instructions in the pipeline, it is likely that there will be a plurality of physical write addresses waiting for their corresponding data. Accordingly, the write queue is a multiple position first-in, first-out buffer accommodating a plurality of physical write addresses.

Conversely, if the instruction corresponding to the physical address is a read instruction, then the translation buffer 30 provides the physical address for an operand of the read specifier. The read address is transferred to the register where it is selected by the multiplexer and delivered to the cache 28. The cache 28 accesses the identified memory location and delivers the data stored at that location to the execution unit 20.

The ability of the CPU 12 to immediately access the cache 28 during operand fetch for the reads, but being delayed during instruction execution for the writes, can cause timing problems in the pipeline. For example, sequential instructions often require the first instruction to modify a memory location while the subsequent instruction reads this same address. Since both instructions are being executed in a series of smaller steps it is possible for the read and write operations to be performed out of sequence. Even when the write specifier for the first instruction is processed before the read specifiers for the second instruction the delay in execution may allow one or more read operands for the second instruction to be fetched before the result of the first instruction is stored. As a result of the fetch of the read operands, it is possible for "stale" data to be returned to the execution unit 20. Accordingly, the CPU 12 must be capable of stalling the read operation until the prior write operation to that same address can be completed.

Additionally, it should be noted that the data written to an identified memory location is not accomplished until the end of the instruction. Accordingly, errors that occur during an instruction which writes to the memory, which prevent the instruction from being completed, do not allow the contents of the identified memory location to be altered. Therefore, the stable state conditions existing before the beginning of this instruction can be restored and the instruction reexecuted without fear that the contents of the memory location have been corrupted by the error.

To take full advantage of the multiple CPUs, the system is configured to allow CPU1-CPU4 to operate in parallel. This parallel operation presents some problems in the form of access conflicts to the shared main memory 14. A system control unit (SCU) 40 is employed to manage these inter-unit communications. The SCU 40 links CPU1-CPU4 to the main memory 14 through a series of independent interfaces. Data requests are received by the SCU 40 from each of the units which, owing to the parallel nature of the CPU operation, occur at unscheduled times, and in particular at the same time. These requests for data transfer are scheduled according to an arbitration algorithm and processed through the appropriate interface to/from the identified unit.

The SCU 40 also links the various system units to a service processor unit (SPU) 42 which performs operator console functions. The SPU 42 has responsibility for status determination and control of the overall operation of the processing system. In particular, the SCU 40 provides the SPU 42 with means for communicating with the plurality of CPUs. The SPU 42 is capable of performing memory access functions, including reads and writes, as well as I/0 reads and writes. Further, the SPU 42 is also capable of initiating interrupts to any or all of the CPUs.

The SPU 42 is also ultimately responsible for error determination and communication to field service technicians. This error detection is accomplished through a serial diagnostic link which provides access to all storage elements within the CPUs and includes a scan controller (SCM) 44 located within the SPU 42. The SCM 44 provides control over the serial diagnostic link present in each of the CPUs and the SCU 40. Each of the CPUs and the SCU 40 interface to the SCM 44 through a scan distributor 45, 46, 47, 48, 49. The serial diagnostic link provides access to the internal latches within the CPUs and the SCU 40 in order for the SPU 42 to perform error analysis. It should be apparent that when an error occurs within one of the system units, the condition of the internal latches may reveal the source of the error. Accordingly the serial diagnostic link connects all of the latches within a selected unit end to end such that the status of these latches may be serially shifted out of the unit and into the SPU 42.

Figure 2:
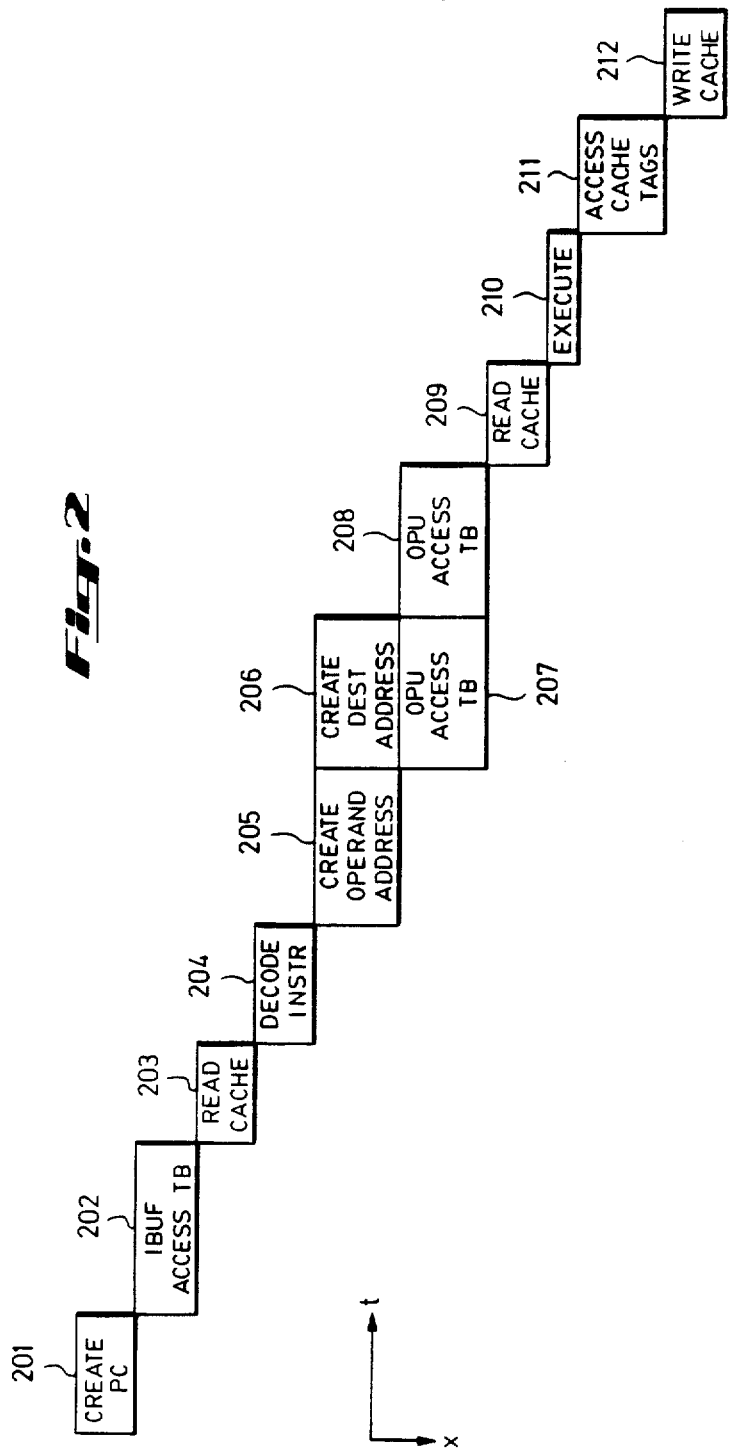
FIG. 2 is functional diagram of the pipeline processing of a long word MOVE operand.

FIG. 2 illustrates the operation of the instruction pipeline for a 4-byte move instruction of the form "MOVL MEM1, MEM2" where MOVL designates the operation to be performed and MEM1 and MEM2 are operand specifiers specifying a source address and a destination address, respectively. The boxes along the diagonal direction in FIG. 2 show the successive actions that CPU 12 takes to perform the move instruction. From left to right in FIG. 2, the actions occur at eleven successively advanced cycles or intervals in time (t). From top to bottom in FIG. 2, the actions occur in ten successive stages along the extent (x) of the pipeline.

In the first stage the program counter (PC) 24 for that instruction is created at location 201. This is done either by incrementing the value of the program counter (24 in FIG. 1) for the previous instruction, or by using the target address of a branch instruction. In the second stage, at location 202, the instruction unit accesses the translation buffer (30 in FIG. 1) with the virtual address of the program counter. The translation buffer converts the virtual address to a physical address and sends it to the memory unit cache 28. It is only necessary to perform the second and third stages if the buffer or cache in the instruction unit does not contain the instruction indicated by the PC 24. The cache is read at location 203 in the third stage and a block of data is loaded into the I-buffer to retrieve the instruction MOVL indicated by the PC 24. At location 204 the fourth stage decodes the instruction by accessing the decode table with the opcode from MOVL (DO).

Thereafter, in the fifth stage at location 205 the operand virtual address is created from the first specifier MEM1. Similarly, at a later time in the fifth stage at location 206, the destination virtual address is created from the second specifier MEM2. At this same time in the sixth stage, at location 207, the OPU 22 accesses the translation buffer 30 to convert the operand virtual address into a physical address. Likewise, at a later time in the sixth pipeline stage, at location 208, the OPU 22 accesses the translation buffer 30 to convert the destination virtual address into a physical address.

Of course, the write operation to the physical address corresponding to MEM2 cannot be completed until the data to be stored has been read at the physical address corresponding to MEM2. Thus, the MEM2 address is stored in the write queue 36 until the data is available. The seventh stage at location 209 reads the memory access unit cache 28 and delivers that data to the execution unit 20.

In the eighth stage, at location 210, all of the operand data and result addresses are available, and the instruction is executed. In the ninth stage, at location 211, the data and a write flag are delivered to the memory unit 16, the write queue address is removed from the write queue, and the cache tags are accessed to test for a cache hit. Assuming a cache hit, the actual write occurs in the tenth and final stage at location 212.

Figure 3:
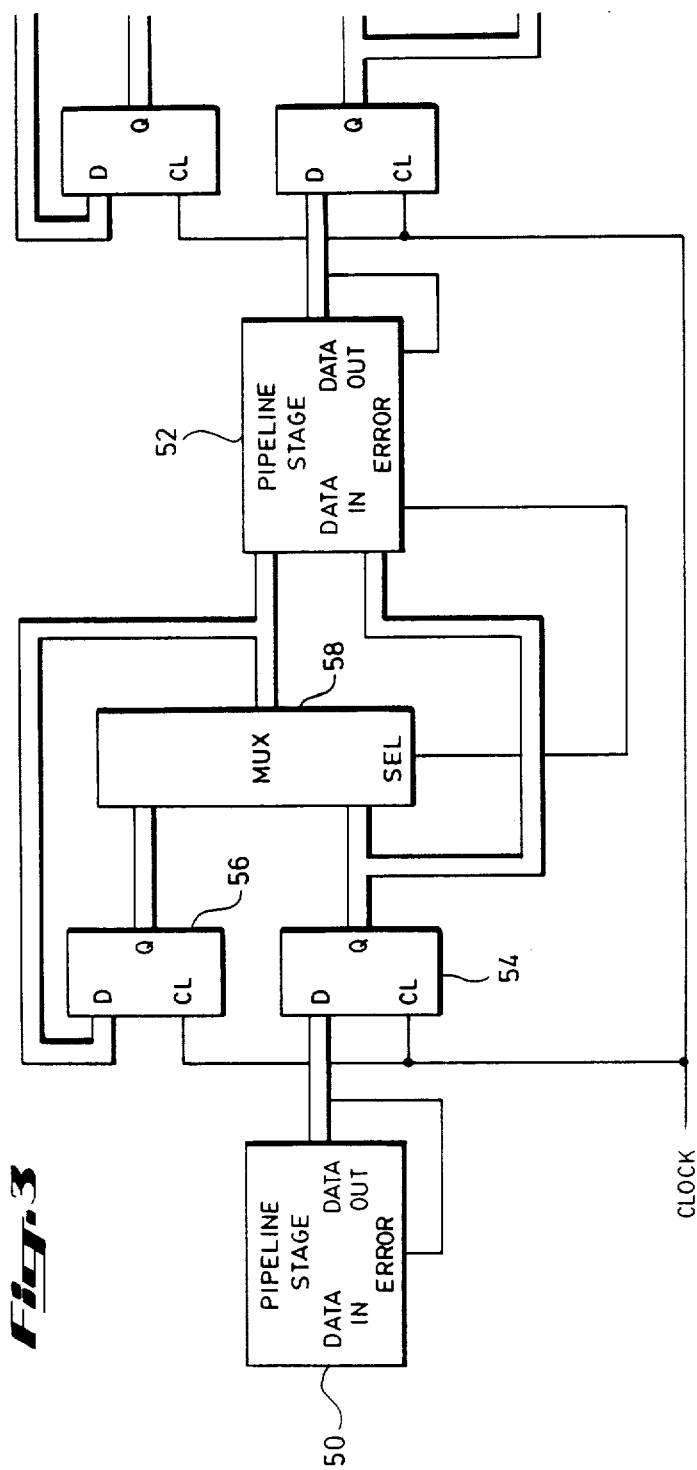
FIG. 3 is a block diagram of a portion of the computer system pipeline hardware.

Referring now to FIG. 3, a portion of the pipeline logic is illustrated. Two of the actual stages of the pipeline are illustrated in block form to generally represent any one of the stages illustrated in FIG. 2. These pipeline stages 50, 52 include a transfer and holding register 54, 56 and a multiplexer 58.

During normal operation, data from pipeline stage 50 is transferred to the transfer register 54 during each transition of the system clock signal. Thereafter, this data is passed through the multiplexer 58 to the next pipeline stage 52 where it is further processed. However, it is possible during operation of the second pipeline stage 52 that an access conflict will occur and the pipeline stage 52 will be unable to currently process the data it has just received. Accordingly, the pipeline stage 52 is preferably capable of storing this data until it completes its current processing and then subsequently process the data. Further, the preceding pipeline stage 50 will likely continue to process data. Thus, in order to prevent stalling of the pipeline, the preceding pipeline stage 50 should preferably have a location in which to store its subsequent data.

The holding register 56 is shown having its input connected to the output of multiplexer 58. In this manner, the data currently contained in the transfer register 54 is passed not only to the pipeline stage 52 but also to the holding register 56. Therefore, when an access conflict is detected by the pipeline stage 52, the signal is passed to the select input of the multiplexer 58, thereby accessing the holding register 56 rather than the transfer register 54. The transfer register 54 is then available to receive subsequent data from the pipeline stage 50 while the data contained in the holding register 56 is available as an input to the pipeline stage 52. Once the data contained in the holding register 56 is processed by the pipeline stage 52, the select signal to the multiplexer 58 is returned to its original value and data contained in the transfer register 54 is again available as an input to the pipeline stage 52.

Further, it is possible for an error to occur in any stage of the pipeline. Errors of this type, which occur in pipeline, will likely prevent the execution of that particular instruction. For example, if the pipeline stage 52 corresponds to the execute stage of the pipeline, then an error will occur if the operand data is found to have incorrect parity. Accordingly, when the result data is transferred to the next pipeline stages, which will eventually write the result data to the cache, the write data stage will corrupt the cache contents since the result data is likely to be incorrect. Therefore, it can be seen that it is important that the error control logic in the execution unit be informed of the error soon enough to stop the final pipeline stages from writing to the cache. This is accomplished by sending all error detection signals to the error control logic immediately, bypassing all the pipe stages. However, as shown in FIG. 3, the error output from the pipe stage that detected the error is used for the select input of the multiplexer 58, thereby holding the erroneous data in holding register 56. This is important during the error logging and recovery sequences performed by the SPU. The SPU can scan out the erroneous data from the holding register 56 using the serial diagnostic link.

As discussed previously, this type of error is generally referred to as a synchronous error because it prevents the current instruction stream from being completed. It should be recognized that a synchronous error can occur in any stage of the pipeline and must ultimately be communicated to the error control logic in the execution unit. Accordingly, any error occurring in the pipeline is propagated immediately to the error control logic. This propagation is accomplished by bypassing all subsequent pipe stages in the pipeline.

Once the error reaches the error control logic, a flag is set in the execution unit. The error flag causes the control logic to evaluate the status of the current instruction even though the error may have been caused as a result of a subsequent instruction in an earlier pipe stage. First, if the current instruction has not changed any register or cache locations and could be restarted from the beginning, then the execution unit stops all further execution. Second, if the current instruction has changed a register or cache location and can not be restarted, then the execution unit will attempt to complete the current instruction. The current instruction will eventually complete if the error occurred as a result of a subsequent instruction in an earlier pipe stage. The execution unit will not attempt to start any new instructions. Finally, the current instruction may not be able to complete due to the error, thereby causing the execution unit to stop in the middle of an instruction and making error recovery more difficult. Once the execution unit has determined the point at which to stop execution for a synchronous error, it transmits a number of signals to the rest of the CPU to indicate that an error has stopped further processing. The SPU is informed to initiate error logging and recovery.

Some errors occur in circuitry which is not part of the main instruction execution pipeline. For example, I/O interrupt requests are sent to the execution unit in a coded format. The requests are prioritized and arbitrated in the execution unit to be recognized at the appropriate time. If the interrupt request code was found to have incorrect parity, the error would not have any effect on instruction stream execution. It would cause the execution unit to miss an interrupt request. This type of error is asynchronous to the instruction stream and is handled differently than the synchronous errors. All the asynchronous errors are reported to the error control logic in the execution unit.

Figure 4:
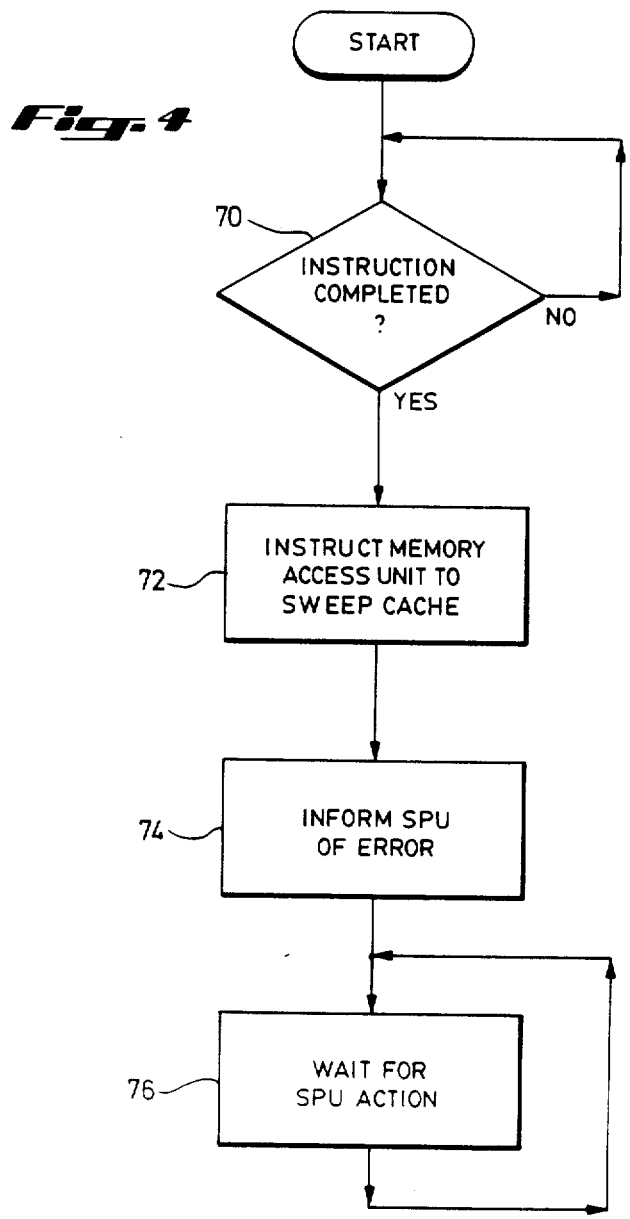
FIG. 4 is a flowchart of a microcode control routine for processing asychronous errors in the execution unit.

Once the error reaches the error control logic, a flag is set in the execution unit. The error flag causes the control logic to complete the current instruction and then initiates a trap in the micro-sequencer of the execution unit 20, causing the microcode to start at a preselected location in the microcode and execute the routine illustrated in flowchart form in FIG. 4.

The microcode controlled micro-sequencer begins execution at decision block 70 awaiting the completion of the last instruction through all the pipe stages. Until the execution unit 20 completes every stage of the execution of the last instruction, control remains in decision block 70 and will not pass to the subsequent microcode. Once the last instruction is complete, the micro-sequencer is ready to process the next microcode and control passes to block 72.

In block 72, the microcode sends a cache sweep command to the memory access unit 16 and control passes to block 74. In block 74, the microcode causes a signal to get transmitted to the SPU 42 to indicate an error has occurred. Control passes to block 76 where the microsequencer stalls waiting for the SPU 42 to respond.

For both synchronous and asynchronous errors, the execution unit attempts to stop between instructions where the machine state is stable. This is accomplished either by stopping an instruction before it changes the machine state or by proceeding with the execution until the completion. Accordingly, after the SPU has corrected the error condition, the CPU is returned to the last stable state and re-execution begins from that point.

Error handling is similar for both synchronous and asynchronous errors. The memory access unit 16 is instructed to sweep the cache 28. During the processing of the error, the CPU 12 is unavailable to respond to memory requests from the other parallel CPUs. Accordingly, any data which is present in the CPU cache, which may be required by one of the parallel CPUs, is unavailable, thereby stalling the operation of the parallel CPUs. To avoid interrupting the processing of the parallel CPUs, all data that is present in the cache 28 that might be accessed by the parallel CPUs is transferred to the main memory 14. Thereafter, the activity of the CPU which has faulted ends and the SCM 44 controls the SCD 45 of the faulting CPU to serially remove the status of the latches in the CPU 12.

Figure 5:
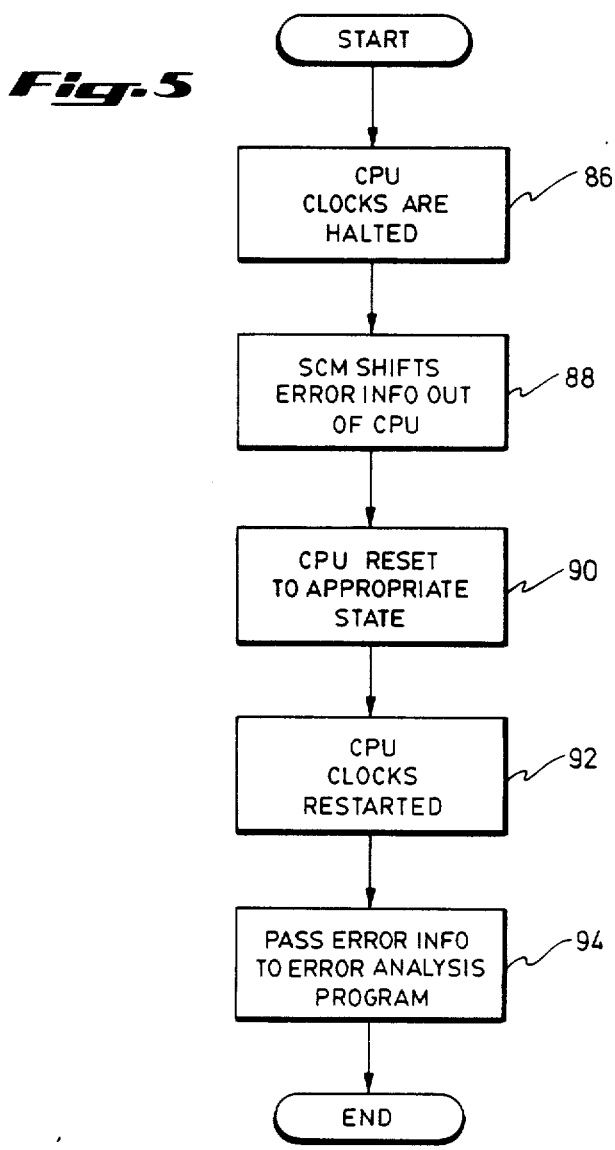
FIG. 5 is a flowchart of a serial diagnostic control routine that samples selected latch values in a faulting CPU.

FIG. 5 is a flowchart of the control effected by the SCM 44 over the SCD 45. The SCM control routine begins at block 86 where the faulted CPU clocks are halted. This prevents continued operation of the faulting CPU until such time as its state values have been sampled by the SCM. Moreover, by halting the CPU clocks, the erroneous state conditions are preserved for future analysis. Control transfers to block 88 where the SCM 44 instructs the SCD 45 to shift the information out of the CPU and into the SCM 44. Once the information has been copied from the CPU 12, control transfers to block 90 where the CPU is reset to its appropriate state. For example, the PC 24 is set to the appropriate value, in the case of asynchronous errors the PC 24 is left at its current state and in the case of synchronous errors the PC 24 is reset to the value corresponding to the instruction which caused the error. Thereafter, control transfers to block 92 where the CPU clocks are restarted and the CPU 12 is allowed to resume execution of its program.

In block 94, the SCM 44 passes the error information that was shifted out of the CPU 12 to an error analysis program. The SPU 42 analyzes the condition of the sampled latches in the CPU 12 to determine where the error occurred. The error analysis program is able to isolate the failing component and communicate that information to a field service repair technician, such that a repair can be quickly and effectively accomplished on even intermittent faults.

Figure 6:
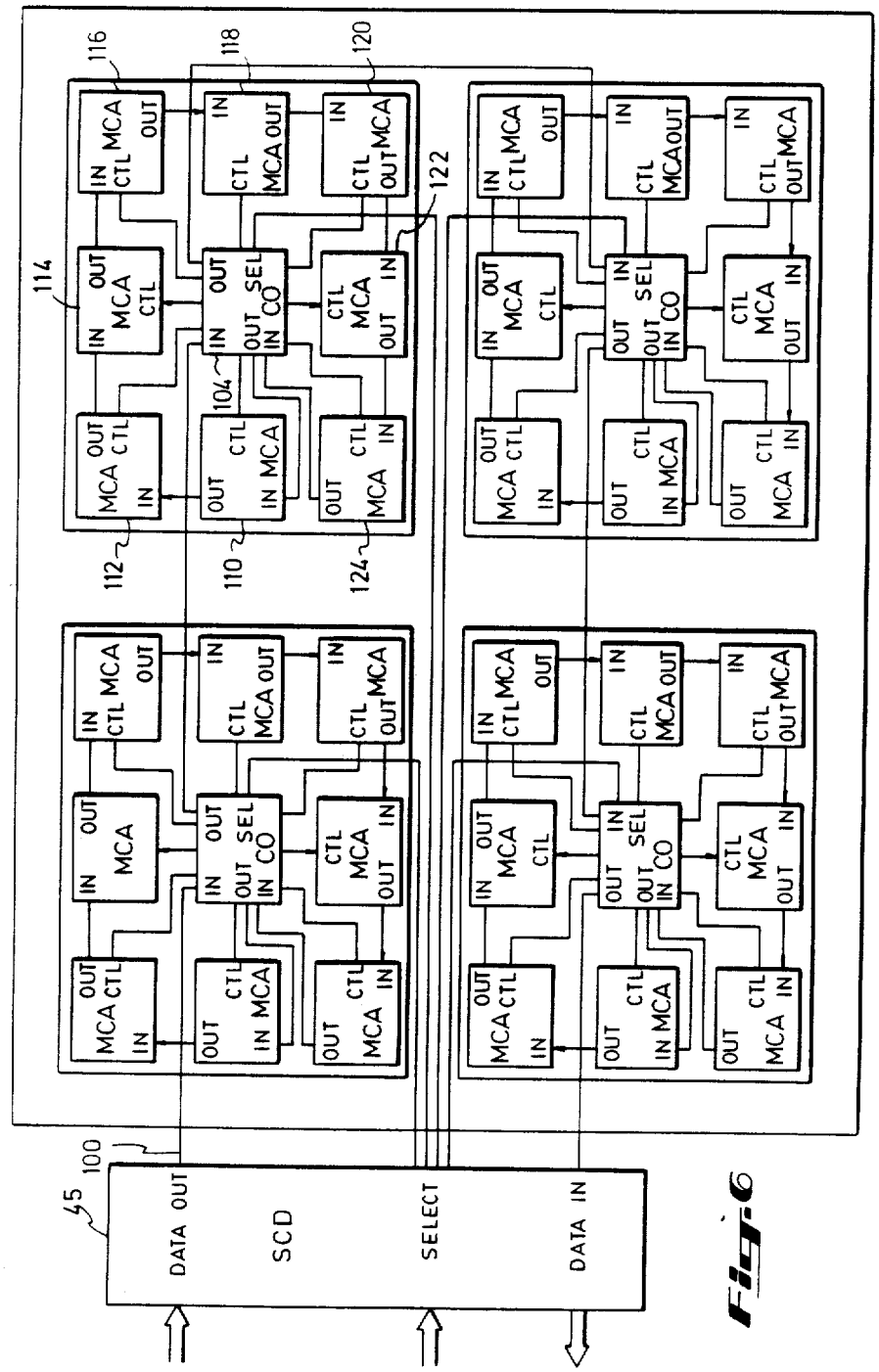
FIG. 6 is a block diagram of the scan distributor in the CPU.

Referring now to FIG. 6, it should be recognized that the CPU 12 is constructed of a plurality of very-large-scale-integrated (VLSI) circuits with each of these circuits containing hundreds of thousands of individual electronic components. These VLSI chips are generally referred to as macro-cell arrays (MCA). Each MCA performs a specified function or group of related functions therein. Accordingly, the serial diagnostic link must pass through each of the MCA's; however, linking all of the MCA's end to end in one large serial loop limits the flexibility of the serial diagnostics to interrogate selected portions of the CPU. Therefore, the MCA's are arranged in multiple loops which can be selectively by-passed. For example, the SCD 45 is shown having a data output line 100 connected to the input of a clock distributor (CD) 102. The CD 102 has two separately addressable output ports for selectively delivering the serial data to a ring of eight MCA's associated with that particular CD 102 and to a subsequent CD 104, respectively. Thus, in response to a command from the SCD 45, the clock distributor 102 delivers the serial data to either the ring of MCA's associated therewith or by-passes this ring of MCA's and delivers the data to the subsequent CD 104.

Likewise, the output of the CD 104 is delivered to the input of a CD 106 and the output of CD 106 is delivered to the input of a CD 108. Finally, the output of CD 108 is connected to the data input of the SCD 45. While the serial diagnostic link has been illustrated to pass through a maximum of four CD's and thirty-two MCA's, it should be recognized that this is for purposes of illustration only, and that any number of CD's and MCA's may be introduced into the serial diagnostic link.

In order to effect by-pass of the CD'102, 104, 106, 108, the SCD 45 also includes four select output lines which are connected to the select inputs of each of the CD's 102, 104, 106, 108. If, for example, it is desired to interrogate the latches contained in the MCA's associated with the CD 104, then only the select line connected to the CD 104 is asserted by the SCD 45. The serial data delivered by the SCD 45 over the line 100 is then delivered to the CD 102 which by-passes that data and sends it directly to the CD 104. The CD 104 passes the data through its second output port to the input of an MCA 110. The MCA 110 includes an output port which is connected to the import port of MCA 112. Similarly, the MCA's 114, 116, 118, 120, 122, 124 are serially connected with the output of MCA 124 returned to the input port of the CD 104. Thus, serial data presented to the input of MCA 110 is returned to the input port of the CD 104 a preselected number of clock cycles thereafter.

CDs 106 and 108 have also been by-passed by the SCD 45 not asserting the select output corresponding to CD's 106, 108. Thus, the serial data passed through the MCA's 110 through 124 is returned through the input port of the CD 104 and through its output port to the CD 106. CDs 106 and 108 both by-pass the data and return it to the data input port of the SCD 45. By allowing the CDs 102, 104, 106, 108 to by-pass data, the selected loop of MCA's may be interrogated in a much shorter period of time.

For example, assuming that each MCA contains 500 latches, then data placed at the serial input port of a selected MCA will reappear at its output 500 clock cycles later. Thus, for data to traverse an eight MCA ring, 4000 clock cycles are necessary. It can be seen that the four CD loop shown in FIG. 6 would require a total of 16,000 clock cycles to determine the value of the first latch in the first MCA of the loop associated with CD 102. However, by-passing each CD, 4000 clock cycles are saved.

Selected interrogation of latches is further enhanced by the ability to by-pass selected MCA's. The CD's 102, 104, 106, 108 are connected to the control inputs of each of their associated MCA's. Over this control link, the CD delivers a plurality of control signals including a select line that operates substantially similar to the CD select line. Thus, the CD is capable of by-passing any selected MCA or any group of selected MCA's.

Referring now to FIG. 7, a schematic of the MCA latches and the associated control circuitry is shown.

The clock system used in the computer system 10 is a 2-phase, non-overlapping type with the "A" phase driving scan latches and the "B" phase driving the slave latches. This provides a raceless design by allowing a single data transition for each latch pair per clock cycle.

FIG. 7 illustrates a small portion of the total number of scan and slave latches in order to present sufficient detail for proper understanding of the invention but limiting the number of latches shown for ease of illustration and to prevent undue confusion. Three scan latches 150a, 150b, 150c are illustrated with each of these scan latches having an input connected to a data source in the CPU. Since the three latches shown are for illustrative purposes only, it is unimportant to identify the precise source of the data inputs to these latches 150a, 150b, 150c, but rather, it is sufficient to realize that these latches store data during normal operation of the CPU. In other words, the scan latches 150a, 150b, 150c do not function merely for the purposes of serially scanning data into and out of the CPU, but also perform the dual function of actual, temporary data storage during normal CPU operation.

Similarly, the slave latches 152a, 152b, 152c, perform the important function of providing raceless serial transfer during the serial data diagnostics, but also operate to store data during normal CPU operation. For example, during normal CPU operation, the slave latches 152a, 152b, 152c operate in conjunction with the scan latches 150a, 150b, 150c in substantially similar manner to the holding and transfer latches discussed in conjunction with FIG. 3. The scan latches 150a, 150b, 150c correspond to the transfer registers 54 and the slave latches 152a, 152b, 152c correspond to the holding registers 56. Thus, data which is currently in scan latches 150a, 150b, 150c that cannot be immediately delivered to the latch data outputs is also placed in the slave latches 152a, 152b, 152c. This prevents stalling of the logic circuits which feed data to the scan latches 150a, 150b, 150c by freeing the scan latches 150a, 150b, 150c to receive the subsequent logic signals while the previous logic signals remain in the slave latches awaiting processing.

Data delivered through the serial diagnostic link is passed through an input buffer 154 to a second input of the first scan latch 150a. It should be appreciated that the serial data presented to the second input of the scan latch 150a is not stored in the scan latch 150a until the A phase scan clock signal is also received by the latch 150a. The A phase scan clock signal is provided by the CD 104 through an input buffer 156 to one input of a three input AND gate 158. A second input to the AND gate 158 is connected through an input buffer 160 to the select output of the CD 104. The output of the AND gate 158 is an A phase scan clock signal delivered to the clock input of each of the scan latches 150a, 150b, 150c. Accordingly, in order for serial data to be passed through the scan latches, 150a, 150b, 150c the CD 104 must assert both the select signal and the scan clock A signal.

The select signal performs a dual function of also causing serial data to by-pass the MCA 110. A multiplexer 162 receives two inputs, one from the input buffer 154 and the second from the output of the final slave latch 152c. Thus, it can be seen that the state of the select signal from the CD 104 determines which of the inputs is delivered to the data output line of the MCA 110. For example, if the CD 104 desires to by-pass the MCA 110, the select signal is deasserted, thereby selecting the zero input to the multiplexer 162 and passing the data directly from the input buffer 154 to the data output line. Conversely, when the select line is asserted the multiplexer 162 passes its opposite input, which corresponds to the serial transfer of data through the scan and slave latch pairs, 150, 152 to the data output line of the MCA 110.

The non-overlapping nature of the scan clock A and scan clock B signals results in the raceless transfer of data through the latch pairs. Data delivered through the input buffer 154 to the input of the scan latch 150a is clocked into the latch 150a in response to a transition in the scan clock A signal. The slave latch 152a is, however, controlled by the scan clock B signal from CD 104. Therefore, the content of the scan latch 150a is not transferred into the slave latch 152a until the scan clock B signal is asserted. Since the scan clock A and scan clock B signals are non-overlapping, data storage in the scan latch 150a and slave latch 152a occur at different times, thereby preventing a race effect through the scan latches 150a, 150b, 150c. The scan clock B signal is delivered through an input buffer 164 to the OK gate 174, and then to the clock inputs of each of the slave latches 152a, 152b, 152c. During valid operation of the scan clocks, the outputs of clock generator 170 are held deasserted.

In addition to the serial diagnostic link being able to access the CPU latches 150a-150c, 152a-152c, it is preferable that CPU memory locations also be available to be read by the serial diagnostic link. Accordingly, the CD 104 can cause latching of data read from a memory location by delivering the scan load signal through the input buffer 166. In order to actually read the contents of CPU memory, the memory address latches must be filled with the address corresponding to the desired memory location and then the clock signal of the memory must be cycled to cause the memory to access the identified memory location and deliver the contents of that memory location to the memory output latches. These memory output latches can then be serially shifted out via the serial diagnostic link to inspect the contents of the specified memory location.

It should be apparent that since the system clock is disabled during serial diagnostics that the system clock cannot be used to cause the CPU memory to deliver the specified contents to the data output latches. Accordingly, a substitute system clock signal must be generated from the available scan clock A signal, but only during scan load operations. Therefore, a three input AND gate 168 receives inputs from the select signal the scan clock A signal, and the scan load signal, so that when all three of these signals are asserted a substitute system clock signal is generated and delivered through OR gate 172 to the system clock inputs of the scan latches 150a, 150b, 150c. Also the scan load signal is delivered to the load enable of the CPU memory to cause the CPU memory to deliver the specified location contents to its output latches.

Ordinarily, the system clock is delivered to an A and B phase clock generator 170 within the MCA 110. The A and B phase clock signals are respectively delivered to a pair of OR gates 172, 174. The outputs of these OR gates 172, 174 are respectively connected to the scan and slave clock inputs of the latches 150a-150c, 152a-152c, the second input to these Or gates 172, 174 are respectively connected to the output of the AND gate 168 and the output of the input buffer 164. Accordingly, during normal operation the system clock is not disabled, the clock generator 170 produces the A and B phase clock signals which operate the scan and slave latches 150a-150c, 152a-152c. However, during operation of the serial diagnostics, the system clock is disabled and the clock generator 170 does not produce A and B phase clock signals.

I claim:

1. A method of handling errors in a pipelined central processing unit of a multiple central processing unit computer system, said central processing unit having an instruction unit for fetching and decoding instructions, an execution unit for executing instructions, and a system clock for clocking said instruction unit and said execution unit, said method comprising the steps of:

detecting an error and delivering an error signal to the execution unit;

determining if the detected error is synchronous and thereby prevents complete execution of an instruction currently being executed by the execution unit;

restoring state conditions of said computer system to their status immediately prior to the beginning of the execution of the current instruction in response to the error being synchronous;

allowing the execution of the current instruction to complete in response to the error being asynchronous and thereby having no effect on the complete execution of the instruction currently being executed by the execution unit;

halting the system clock of the central processing unit;

shifting the contents of selected central processor unit latches out of the central processing unit; and restarting the central processing unit system clock.

2. A method, as set forth in claim 1, wherein said central processing unit has an instruction pipeline, and wherein said method further comprises the step of pipelining the error signal in parallel with the instruction pipeline.

3. A method, as set forth in claim 1, wherein said central processing unit has an instruction pipeline, and wherein the step of delivering an error signal to the execution unit includes bypassing the instruction pipeline.

4. A method, as set forth in claim 1, further comprising the step of supplying a memory clocking signal to a memory to transfer memory data from said memory to said selected central processing unit latches so that said memory data is serially shifted from said latches and out of the central processing unit.

5. A method, as set forth in claim 1, wherein the step of shifting the contents of selected central processing unit latches includes shifting the data through a single master/slave latch pair in response to a single transition in each of a pair of non-overlapping scan clock signals.

6. A method, as set forth in claim 5, wherein the step or shifting data includes delivering a selected one of the non-overlapping scan clock signals to a clock input of the master latch, delivering the other non-overlapping scan clock signal to a clock input of the slave latch, delivering the contents of the master latch to the slave latch in response to the master latch receiving the selected one of the non-overlapping scan clock signals, and receiving the contents of the master latch into the slave latch in response to the slave latch receiving the other non-overlapping scan clock signal.

7. An apparatus for handling errors in a pipelined central processing unit of a multiple central processing unit computer system, the central processing unit having an instruction pipeline adapted for processing an instruction in a series of discrete steps wherein each discrete processing step is performed simultaneous with discrete processing steps of other instructions, whereby multiple instructions are concurrently processed, one of the discrete processing steps being execution of the instruction by an execution unit having a system clock for clocking said processing unit having a system clock for clocking said instruction pipeline, said apparatus comprising:

means for detecting an error and delivering an error signal to the execution unit;

means for determining if the detected error is synchronous and thereby prevents complete execution of the instruction currently being executed by the execution unit;

means for restoring state conditions of the computer system to their status immediately prior to the beginning of the execution of the current instruction in response to the error being synchronous;

means for allowing the execution of the current instruction to complete in response to the error being asynchronous and thereby having no effect on the complete execution of the instruction currently being executed by the execution unit;

means for halting the system clock of the central processing unit;

means for serially shifting the contents of selected central processing unit latches out of the central processing unit; and means for restarting the central processing unit system clock.

8. An apparatus, as set forth in claim 7, wherein the error detecting means includes means for pipelining the error signal in parallel with the instruction pipeline.

9. An apparatus, as set forth in claim 7, wherein the error detecting means includes means for the error signal to bypass the instruction pipeline.

10. An apparatus, as set forth in claim 7, wherein the means for serially shifting includes a plurality of master and slave latching means being serially connected together for shifting data from each pair of the master and slave latching means into a subsequent pair of the master and slave latching means in response to receiving a single pulse in each of a pair of non-overlapping scan clock signals.

11. An apparatus, as set forth in claim 10, wherein the means for serially shifting includes means for delivering a selected one of the non-overlapping scan clock signals to the master latching means, delivering the other non-overlapping scan clock signal to the slave latching means, delivering the contents of the master latching means to the slave latching means in response to the master latch receiving the selected one of the non-overlapping scan clock signals, and receiving the contents of the master latch into the slave latch in response to the slave latch receiving the other non-overlapping scan clock signal.

12. An apparatus, as set forth in claim 11, wherein the master latching means includes a master latch having a first data input connected to an input from a logic circuit associated with normal operation of the central processing unit and a second data input connected to the output of a serially prior slave latching means, said master latch being adapted to store the first data input therein in response to a transition in the system clock signal and to store the second data input therein in response to a transition in the selected one of the non-overlapping scan clock signals.

13. An apparatus, as set forth in claim 12, wherein the slave latching means includes a slave latch having a data input connected to the output of the master latch and being adapted for storing the data input therein in response to a transition in the other non-overlapping scan clock signal.

14. In a multi-processor computer system having at least one pipelined central processor unit and a service processor, an apparatus for handling errors in said pipelined central processing unit, said central processing unit having an instruction pipeline adapted for processing an instruction in a series of discrete steps wherein each discrete processing step is performed simultaneous with discrete processing steps of other instructions, whereby multiple instructions are concurrently processed, one of the discrete processing steps being execution of the instruction by an execution unit of the central processing unit, said central processing unit having a system clock for clocking said instruction pipeline, said apparatus comprising:

means for detecting an error and delivering an error signal to the execution unit, said means for detecting an error including means for pipelining the error signal in parallel with the instruction pipeline;

means for determining if the detected error is synchronous and thereby prevents complete execution of the instruction currently being executed by the execution unit;

means for restoring state conditions of said central processing unit to their status immediately prior to the beginning of the execution of the current instruction in response to the error being synchronous;

means for allowing the execution of the current instruction to complete in response to the error being asynchronous and thereby having no effect on the complete execution of the instruction currently being executed by the execution unit;

means for halting the system clock of the central processing unit;

means for serially shifting the contents of selected central processing unit latches out of the central processing unit and into said service processor for error determination;

means for resetting the central processing unit to an appropriate state; and means for restarting the central processing unit system clock.

15. An apparatus, as set forth in claim 14, wherein said means for serially shifting includes a plurality of master and slave latching means being serially connected together for shifting data from each pair of the master and slave latching means into a subsequent pair of the master and slave latching means in response to receiving a single pulse in each of a pair of non-overlapping scan clock signals.

16. An apparatus, as set forth in claim 15, wherein the means for serially shifting includes means for delivering ga selected one of the non-overlapping scan clock signals to the master latching means, delivering the other non-overlapping scan clock signal to the slave latching means, delivering the contents of the master latching means to the slave latching means in response to the master latching means receiving the selected one of the non-overlapping scan clock signals, and receiving the contents of the master latch into the slave latching means in response to the salve latching means receiving the other non-overlapping scan clock signal.

17. An apparatus, as set forth in claim 16, wherein the master latching means includes a master latch having a first data input connected to an input from a logic circuit associated with normal operation of the central processing unit and a second data input connected to the output of a serially prior slave latching means, said mater latch being adapted to store the first data input therein in response to a transition in the system clock signal and to store the second data input therein in response to a transition in the selected one of the non-overlapping scan clock signals.

18. An apparatus, as set forth in claim 17, wherein the slave latching means includes a slave latch having a data input connected to the output of the master latch and being adapted for storing the data input therein in response to a transition in the other non-overlapping scan clock signal.

* * * * *

UNITED STATES PATENT AND TRADEMARK OFFICE
CERTIFICATE OF CORRECTION

PATENT NO. : 4,982,402
DATED : January 1, 1991
INVENTOR(S) : Richard C. Beaven, et. al.

Page 1 of 2

It is certified that error appears in the above-indentified patent and that said Letters Patent is hereby corrected as shown below:

Column 1, line 46, change "field" to --filed--.

Column 1, line 51, change "MUNIT" to --unit--.

Column 15, line 7, change "of" to --for--.

Column 15, line 56, change "or" to --of--.

Column 16, line 7, after "unit" add --of the central processing unit, said central processing unit--.

Column 16, line 8, after "said" delete --processing unit having a system clock for clocking said--

Column 18, line 17, change "ga" to --a--.

UNITED STATES PATENT AND TRADEMARK OFFICE
CERTIFICATE OF CORRECTION

PATENT NO. : 4,982,402
DATED : January 1, 1992
INVENTOR(S) : Richard C. Beaven, et al.

It is certified that error appears in the above-indentified patent and that said Letters Patent is hereby corrected as shown below:

Column 18, line 25, change "slave" to --slave--.

Signed and Sealed this

Fifteenth Day of March, 1994

Attest:

BRUCE LEHMAN

Attesting Officer     Commissioner of Patents and Trademarks